US008873866B2

(12) United States Patent
Cardno (10) Patent No.: US 8,873,866 B2
(45) Date of Patent: Oct. 28, 2014

(54) METHOD AND SYSTEM FOR CALCULATING BREAKPOINTS IN A DATA VISUALIZATION SYSTEM

(75) Inventor: Andrew John Cardno, San Diego, CA (US)

(73) Assignee: New Bis Safe Luxco S.A R.L, Luxembourg (LU)

( * ) Notice: Subject to any disclaimer, the term of this patent is extended or adjusted under 35 U.S.C. 154(b) by 281 days.

(21) Appl. No.: 13/516,127

(22) PCT Filed: Dec. 14, 2010

(86) PCT No.: PCT/NZ2010/000251
§ 371 (c)(1),
(2), (4) Date: Dec. 26, 2012

(87) PCT Pub. No.: WO2011/081535
PCT Pub. Date: Jul. 7, 2011

(65) Prior Publication Data
US 2013/0094767 A1    Apr. 18, 2013

Related U.S. Application Data (60) Provisional application No. 61/286,030, filed on Dec. 14, 2009.

(51) Int. Cl.
*G06T 11/00* (2006.01)
*G06F 17/18* (2006.01)
*G06T 7/00* (2006.01)

(52) U.S. Cl.
CPC .............. *G06T 7/0085* (2013.01); *G06F 17/18* (2013.01)
USPC .......................................... 382/199; 345/440

(58) Field of Classification Search
None
See application file for complete search history.

(56) References Cited

U.S. PATENT DOCUMENTS

| | | | | |
|---|---|---|---|---|
| 6,429,868 | B1* | 8/2002 | Dehner et al. | 345/440 |
| 7,825,929 | B2* | 11/2010 | Kincaid | 345/440 |
| 2008/0091757 | A1 | 4/2008 | Ingrassia et al. | |
| 2008/0263468 | A1 | 10/2008 | Cappione et al. | |
| 2010/0039433 | A1 | 2/2010 | McGreevey et al. | |
| 2010/0312793 | A1* | 12/2010 | Brown et al. | 707/770 |
| 2011/0141118 | A1* | 6/2011 | Cardno et al. | 345/441 |
| 2011/0261049 | A1* | 10/2011 | Cardno et al. | 345/419 |
| 2012/0075324 | A1* | 3/2012 | Cardno et al. | 345/589 |

FOREIGN PATENT DOCUMENTS

WO    WO 2009/154484    12/2009

OTHER PUBLICATIONS

International Search Report for International Application No. PCT/NZ2010/000251 mailed Apr. 21, 2011.

* cited by examiner

*Primary Examiner* — Jon Chang
(74) *Attorney, Agent, or Firm* — Merchant & Gould P.C.

(57) ABSTRACT

In a data visualization computing system, a computer implemented method of determining transition boundaries from data values in a data set for the generation of a graphical heatmap representation of the data values, the method including the steps of the data visualization computing system: retrieving the data values in the data set; determining a logarithmic base value, wherein the base value is calculated based on the retrieved data values; and generating transition boundaries for the heatmap representation by calculating transition boundary values, wherein the transition boundary values are calculated using an exponential function with a base value equal to the determined logarithmic base value and an exponent value that is incrementally increased from a value of one to a maximum exponent value to represent the retrieved data values.

21 Claims, 6 Drawing Sheets

METHOD AND SYSTEM FOR CALCULATING BREAKPOINTS IN A DATA VISUALIZATION SYSTEM

This application is a National Stage Application of PCT/NZ2010/000251, filed 14 Dec. 2010, which claims benefit of U.S. Provisional Ser. No. 61/286,030, filed 14 Dec. 2009 and which applications are incorporated herein by reference. To the extent appropriate, a claim of priority is made to each of the above disclosed applications.

FIELD OF THE INVENTION

The present invention relates to an improved method and system for calculating breakpoints in a data visualization system.

BACKGROUND

Many factors may be taken into account when designing and creating a useful system for generating graphical visualizations of data retrieved from one or more sources. One such factor is to ensure that the representation of data in the visualizations is done so in a manner that enables a user to easily discern the relevant information from the data, or to interpret the data in such a way that is useful to the user. This becomes particularly relevant when analyzing extremely large sets of data, and more so when the large sets of data are skewed.

One particular example of a graphical visualization method that is used to help users understand the relevance of the data values within data sets is the heatmap. A heatmap is generally a two dimensional display which may allocate a color based on the value of a plurality of variable dimensional data values that have been retrieved from one or more data sources. For a particular data point, a first and second dimensional data value is used to place the data point at an x, y position on the map. A third dimensional data value may be indicated by displaying the data point in one of various colors available to the graphics display system. The color selected for the particular data point is based on the dimensional data value associated with the third dimension of the data for that data point.

Heatmaps may use other means to identify the dimensional data values other than color. For example, grades of shading, symbols, shapes etc may all be used in a heatmap to show the relative placement of data values with respect to each other.

By using heatmaps as opposed to standard chart methods, it becomes possible to plot on a two-dimensional map, three dimensions of information associated with the data. It then becomes easier for a user to get an understanding of how the different dimensions of the data vary in relation to each other by viewing the heatmap. Further, if data is plotted using three dimensional co-ordinates x, y and z, a fourth dimension may be added using color, for example, to produce a heatmap.

For example, data values (such as demographic data values) associated with a population of a particular area covered by co-ordinates x, y may be plotted to easily determine how the population varies over an area. That is, the x, y position on the map indicates the actual geographical x, y co-ordinates of where individuals are living. A third dimension may be added to indicate the number of the individuals living at the various x, y co-ordinates, where different colors indicate group sizes per area. For example, at co-ordinate x1, y1 there are 100 people living in a radius of 200 meters, at point x2, y1 there are 76 people living in a radius of 200 meters, etc. The different values 100, 76 etc may be plotted using different colors.

In a further example, tolerance data values associated with a manufacturing process may be plotted against a factory layout to determine where errors are occurring in the process. For example, at manufacturing position 1 indicated by a rectangle between points (x1, y1), (x1, y2), (x2, y1) and (x2, y2) a tolerance value of 10% is measured, where the 10% indicates that the product being manufactured has been measured as being 10% over or under a pre-stored desired value. Other manufacturing areas as defined by x, y co-ordinates may be monitored to detect tolerance values that range from 1% up to 100%, or greater where the tolerance value is more than twice the pre-stored desired value. The manufacturing areas may be plotted on an x, y plot where various different colors, for example, are used to indicate the measured tolerance values.

It will be understood that the x, y values in a heatmap are not required to be associated with geographical or physical locations and may be associated with any other variable that may be measured or determined.

However, an important factor that should be borne in mind when developing a graphical visualization system is that the heatmap should have a limited number of colors or shadings to represent the different value ranges of the data in order to represent the information in a clear manner. Therefore, thought is required on how to represent the different value levels of the data in the heatmap over the whole range of the data in a manner that clearly and accurately conveys the required information associated with the data, without swamping the user with too many colors or shadings and without losing or masking relevant data values.

Data values for a number of data points in a set of data can be distributed over a large range, producing a skewed data set. For example, data values may exist within the data set that have values in single units (or percentages or portions thereof) up to values in units of a thousand, million or higher. When generating a heatmap to visualize these data values, a number of different colors or shades of a particular color (or a mixture thereof) are allocated for each of a number of preset ranges of the data values being represented. A different shade or color may be allocated to represent the data values over a specific range of data values. For example, a first color such as blue may be allocated to represent data values in the range from 0 to 1000, a second color, green, may be allocated to represent data values in the range from 1001 to 2000, a third color, yellow, may be allocated to represent data values in the range from 2001 to 3000, etc.

When developing a heatmap generating system, it is usual to make a rough estimate of the maximum data value that is likely to be retrieved by the system and visualized, determine the number of suitable color or shade transitions that should be made available to construct an easily discernible heatmap of the data values, and then to uniformly allocate the number of available transitions to the data values through a simple division process.

For example, if the user guesses that the maximum data value is unlikely to exceed 10,000 and the number of available or chosen color transitions for the heatmap is chosen to be 10, then each color is uniformly allocated to a range over 10,000/10=1000 data values. The colors may therefore be assigned in a linear manner as shown in the following example:

Black=1 to 1000
Dark Blue=1001 to 2000
Light Blue=2001 to 3000
Turquoise=3001 to 4000
Dark Green=4001 to 5000
Light Green=5001 to 6000
Dark Yellow=6001 to 7000
Light Yellow=7001 to 8000
Dark Red=8001 to 9000
Light Red=9001 to 10000

Therefore; according to an example, a data point representing a data value of 8560 will be represented by the color Dark Red, and a data point representing a data value of 2340 will be represented by the color Light Blue.

Using this type of method may be suitable for straight forward linear data sets with predictable and limited maximum data values, however in real world data sets taken from real life measurement scenarios such as in manufacturing processes, quality control measurements, scientific experimental data, business records etc, the data values can be far from linearly organized and can result in very skewed data sets with the majority of data values in the data set being located over a very small range.

Further, some potentially more important data values in the data set may be positioned in a different range located statistically distant from the majority of the data set which may result in these important data values not being clearly recorded on the heatmap. Therefore, it is required to allocate a large number of different transitions to cover all the available data values in the data sets that are being mapped to the heatmap. This can result in a heatmap that is unable to graphically show the relevance of the more statistically distant data values as the data points representing these distant data values are swamped by the data points representing the data values of the more common data points. This may result in the user not being able to detect the more distant data points in the map.

Further, unnecessary calculations may be made to determine a large number of transition points which may not have data points located there between. This therefore wastes computing power, time and energy.

In addition, it may be required to first estimate the likely maximum data value in the data set. Inaccurate estimations can occur, thus resulting in the larger more important data values being overlooked and so data points associated with the larger values may not be represented in the heatmap.

An object of the present invention is to provide a system or method that generates breakpoint values for heatmap data to create a heatmap that displays information in an informative manner over the full range of the data, or to at least provide the public with a useful choice.

The present invention aims to overcome, or at least alleviate, some or all of the afore-mentioned problems.

SUMMARY OF THE INVENTION

The present invention provides a system or method that enables more accurate and easily understandable representations of skewed data sets.

According to one aspect, the present invention provides, in a data visualization computing system, a computer implemented method of determining transition boundaries from data values in a data set for the generation of a graphical heatmap representation of the data values, the method including the steps of the data visualization computing system: retrieving the data values in the data set; determining a logarithmic base value, wherein the base value is calculated based on the retrieved data values; and generating transition boundaries for the heatmap representation by calculating transition boundary values, wherein the transition boundary values are calculated using an exponential function with a base value equal to the determined logarithmic base value and an exponent value that is incrementally increased from a value of one to a maximum exponent value to represent the retrieved data values.

According to a further aspect, the present invention provides, in a data visualization computing system, a computer implemented method of determining transition boundaries from data values in a data set for the generation of a graphical heatmap representation of the data values, the method including the steps of the data visualization computing system: retrieving the data values in the data set; determining a maximum data value from the retrieved data values; determining how many transition boundaries are required for generating the heatmap; and calculating a logarithmic base value; and generating the transition boundaries for the heatmap representation by calculating transition boundary values, where the transition boundary values are calculated using an exponential function with a base value equal to the determined logarithmic base value and an exponent value that is incrementally increased from a value of one to a value equal to the number of determined transition boundaries.

According to yet a further aspect, the present invention provides a data visualization computing system for determining transition boundaries from data values in a data set for the generation of a graphical heatmap representation of the data values, the data visualization computing system including: a data retrieval module arranged to retrieve the data values in the data set; a data analysis module arranged to determine a logarithmic base value, wherein the base value is calculated based on the retrieved data values and a set of rules stored in a rules engine; and a breakpoint calculation module arranged to generate transition boundaries for the heatmap representation by calculating transition boundary values, wherein the transition boundary values are calculated using an exponential function with a base value equal to the determined logarithmic base value and an exponent value that is incrementally increased from a value of one to a maximum exponent value to represent the retrieved data values According to yet a further aspect, the present invention provides a data visualization computing system for determining transition boundaries from data values in a data set for the generation of a graphical heatmap representation of the data values, the data visualization computing system including: a data retrieval module arranged to retrieve the data values in the data set; a data analysis module arranged to determine a maximum data value from the data values in the data set, determine how many transition boundaries are required for generating the heatmap and calculate a logarithmic base value; and a breakpoint calculation module arranged to generate the transition boundaries for the heatmap representation by calculating transition boundary values, where the transition boundary values are calculated using an exponential function with a base value equal to the determined logarithmic base value and an exponent value that is incrementally increased from a value of one to a value equal to the number of determined transition boundaries.

BRIEF DESCRIPTION OF THE DRAWINGS

Embodiments of the present invention will now be described, by way of example only, with reference to the accompanying drawings, in which.

DETAILED DESCRIPTION OF THE INVENTION

According to various embodiments of the present invention, systems and methods are herein described that determine transition boundaries from data values in a data set for the generation of a graphical heatmap representation.

Although the various embodiments described are in relation to the representation of heatmaps, it will be understood that the methods may also be applied to other suited graphical representation methods, such as data plots and graphs for example.

The methods and systems described may be utilized on any suitable data visualization system where data values are represented as data points which are displayed using various different formats based on the data value itself or a range of values in which the data value lies.

For example, the data points representing the data values may be displayed using various colors depending on the data values being represented. The color used to represent the data points is controlled by the system and is caused to change as the data values change. A breakpoint or transition boundary is the area in the graphical representation where the color changes. A breakpoint value or transition boundary value is the value of the data points at the breakpoint or transition boundary. That is, new colors are used to represent data points for data values that fall within the breakpoint or transition boundary values associated with a particular region on the representation.

First Embodiment

According to this first embodiment, a data visualization computing system utilizes the following methodology using various modules and engines.

In summary, the data visualization system includes at least a processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the data visualization system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions, may be developed or implemented using any suitable software programming language and toolkit, such as, for example, a C-based language and compiler. Further, the program instructions may be stored in any suitable manner such that they can be transferred to the memory device or read by the processor, such as, for example, being stored on a computer readable medium. The computer readable medium may be any suitable medium for tangibly storing the program instructions, such as, for example, solid state memory, magnetic tape, a compact disc (CD-ROM or CD-R/W), memory card, flash memory, optical disc, magnetic disc or any other suitable computer readable medium.

The data visualization system is arranged to be in communication with external data storage systems or devices in order to retrieve the relevant data.

It will be understood that the system herein described for calculating the breakpoints includes one or more elements that are arranged to perform the various functions and methods as described herein. The embodiments herein described are aimed at providing the reader with an example of a conceptual view of how various modules and/or engines that make up the elements of the system may be interconnected to enable the functions to be implemented. Further, the embodiments of the description explain, in system related detail, how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

It will be understood that the modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using, any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general purpose computing system specifically programmed to perform the described steps. Alternatively, the methods described herein may be implemented using a specific computer system such as a data visualization computer, a database query computer, a graphical analysis computer, a gaming data analysis computer, a manufacturing data analysis computer, a business intelligence computer etc., where the computer has been specifically adapted to perform the described steps on specific data captured from an environment associated with a particular field.

According to this example, the system determines a logarithmic base value for use in calculating the transition boundary values that define the transition boundaries. The logarithmic base value is determined from data values within a data set. According to this example, the logarithmic base value is calculated based on a single variable.

Figure 1:
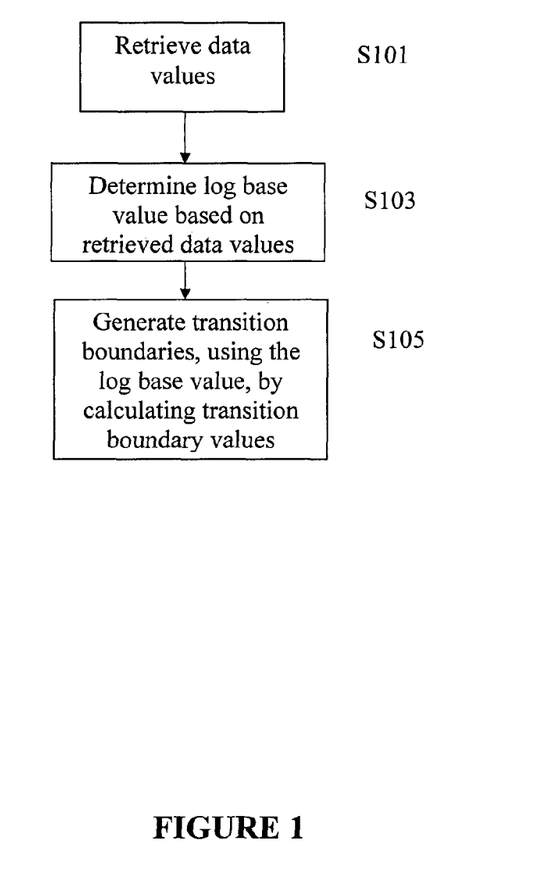
FIG. 1 shows a flow diagram of a method according to, an embodiment of the present invention.

FIG. 1 shows a flow diagram of how the herein described system utilizes a computer implemented method of determining transition boundaries from data values in a data set for the generation of a graphical heatmap representation of the data values.

In step S101, data values in a data set are retrieved from a data store. In step S103, a logarithmic base value is determined based on the retrieved data values. In step S105, transition boundaries are generated from calculated transition boundary values using the log base value.

The transition boundary values are calculated by using an exponential function with has a base value and an exponent value. The base value is the determined logarithmic base value. The exponent value is incrementally increased from a value of one up to a maximum exponent value in order to represent the retrieved data values.

As an example, the first transition boundary is set between a value of 0 and a value where the exponent value is 1 (i.e. the base value). The second transition boundary is set between a value where the exponent value is 1 and a value where the exponent value is 2. The exponent value is increased incrementally up until the maximum exponent value.

According to this embodiment the exponent value is increased in integer units. Although the above example increases the exponent value by 1, it will be understood that where particularly large values are detected within the data set, the exponent value may be increased by a value of 2, 3 or 4 for example, or indeed any other integer value, which may be dependent on the data values being analyzed.

Alternatively, the exponent value may be increased by fractional values. For example, the exponent value may be increased by a half, quarter, tenth etc to determine the transition boundary values. It will also be understood that fractional values greater than 1 can also be used to increase the exponent value.

According to one option, the maximum exponent value may be incrementally increased to a maximum exponent value which results in a transition boundary value that is greater than or equal to a maximum data value from within the data set being analyzed.

The logarithmic base value may be determined using various different techniques as herein described.

According to a first technique, the base value may be calculated from one or more minimum data values within the data set. That is, the system may determine which data value within the data set is the lowest data value that is greater than 1. Once this is determined, this value is set as the base value.

Alternatively, an average or median (or other suitable statistical calculation) of minimum data values may be calculated.

It will be understood that other criteria may be applied to the selection of a minimal data value, and that a data value within a specific range may be selected as an alternative.

According to a second technique, the base value may be calculated from one or more maximum data values within the data set.

For example, the base value may be calculated as a percentage value or fraction of one or more determined maximum data values. For example, the maximum data value within the data set may be determined, and a 0.01% value of that maximum data value may be used as the base value. It will be understood that an appropriate and useful selection of the percentage value will depend on the expected maximum data value. Therefore, a user may specifically input a % value for the system to use after an initial analysis of the data set.

Alternatively, the system may automatically determine the % value to use depending on the one or more maximum data value detected.

For example, a look up table may be used to determine the percentage based on the units the maximum value is expressed in.

| Units | % |
|---|---|
| 1,000,000 | 0.0001 |
| 100,000 | 0.001 |
| 10,000 | 0.01 |
| 1,000 | 0.1 |
| 100 | 1 |
| 10 | 10 |
| 1 | 100 |
| 0.1 | 1000 |
| 0.01 | 10000 |

Therefore, if the maximum data value=23, the units are in units of 10, and so the % value used is 10%. 10% of 23=2.3=base value.

According to another example, if the maximum value detected is in units of a million such as 33,000,000, the % value is 0.0001%. Therefore, the base value is 0.0001% of 33,000,000=3.3.

It will be understood that as an alternative a divisible factor equivalent to a percentage ratio may be used. For example, instead of using 10% a divisible factor of 0.1 may be used.

It will also be understood that the base value calculated may be limited to fall within a pre-defined range as set by the user. For example the user may not wish the base value to be over a pre defined value as this would cause the transition boundary values to increase too quickly. For example, the user may set a range of between 1.5 and 3 for the base value.

Further, it will be understood that the system would implement a rule to avoid the base value being set at 1.

According to a third technique, the base value may be calculated from the total data value of the data set.

For example, the base value may be calculated as a percentage value or fraction of the total data value. The same techniques as described above may be used to determine what percentage value to use. The fractional value may be determined using similar methodologies.

Each of the calculated transition boundary values may be used as a maxima or minima for the transition boundaries.

Each data value that falls within a transition boundary is then graphically represented as a data point in a particular forms based on the transition in which the data point lies. For example, the transition boundaries may determine what color or shade the data values are represented in the graphical heatmap representation.

The system may also be adapted to calculate suitable breakpoint values where the data values in the data set are less than 1. It will be understood that the techniques described above are required to be modified in order to take into account such a scenario.

A first technique for handling data values less than unity is to multiply the data values by a suitable factor such that the resultant modified values are greater than 1. These modified values may then be used to calculate the breakpoint values. Thus, when the values are plotted on the graphical representation the scale on the axes may be represented as the original data values (i.e. less than 1), but the breakpoint calculations are based on a modified version of the data values where the modified version has no data values less than unity.

For example, if the data values were in the range of 0.01 to 0.5, the maximum data value may be multiplied by a factor of 200 to produce a temporary maximum data value of 100. Note that the factor used ensures that the minimum data value also exceeds 1. This temporary maximum data value may then be used to determine the logarithmic base value.

That is, with a temporary maximum data value of 100, the logarithmic base value could be taken to be 2% of 100, i.e. 2.

Therefore, the data values may be mapped to a modified axis as follows, where the modified axis value is 200× the original data value:

| Original | Mapped value (data value maps onto this modified value) |
|---|---|
| 0.01 | 2 |
| 0.02 | 4 |

-continued

| Original | Mapped value (data value maps onto this modified value) |
|---|---|
| 0.03 | 6 |
| 0.04 | 8 |
| . | . |
| . | . |
| . | . |
| 0.3 | 60 |
| 0.4 | 80 |
| 0.5 | 100 |

| Breakpoint values (7 transitions) | Color Representation for Breakpoint |
|---|---|
| 0 → 2 | red |
| 2 → 4 | orange |
| 4 → 8 | yellow |
| 8 → 16 | green |
| 16 → 32 | blue |
| 32 → 64 | grey |
| 64 → 132 | black |

That is, where the modified mapped value is within the breakpoint value region for that breakpoint, the relevant color representation is applied to the associated data point value.

For example, for the original data value 0.01, the modified mapped value is 2 (i.e. a factor of 200 times greater than the original) which falls within the first breakpoint value 0→2 and so is assigned the transition color of red associated with that transition boundary.

The following table gives further examples of suitable transition colors for other original data values where the modified value for the original values is shown in brackets.

| Original data value | Transition color (based on modified axis value) |
|---|---|
| 0.01 (2) | red |
| 0.02 (4) | orange |
| 0.03 (6) | yellow |
| 0.04 (8) | yellow |
| . | . |
| . | . |
| . | . |
| 0.3 (60) | grey |
| 0.4 (80) | black |
| 0.5 (100) | black |

According to a second technique for handling data values less than unity, the maximum data value itself may be used as the logarithmic base value.

For example, if the maximum data value is taken to be 100 ms, and the number of transitions required is 5 (for example as selected by a user input), the breakpoint transition boundaries are calculated as follows:

The fifth transition boundary is first calculated from a value where the maximum value is the base and has an exponent value of 1, to a value where the maximum value is the base and has an exponent value of 2, as follows:

$0.1^1 \to 0.1^2$

The next transition is calculated from a value where the maximum value is the base and has an exponent value of 2, to a value where the maximum value is the base and has an exponent value of 3, as follows $0.1^2 \to 0.1^3$ The exponent value is then increased by 1 two more times to provide a third and fourth transition boundary of:

$0.1^3 \to 0.1^4$ and $0.1^4 \to 0.1^5$

The fifth and final transition boundary is then taken as the previous boundary through to zero as follows:

$0.1^5 \to 0$

Therefore, the final transition boundary always ends with a final boundary value of 0.

In a similar manner as described above, as an alternative, the exponent value may be increased using values other than one including fractions.

Figure 2:
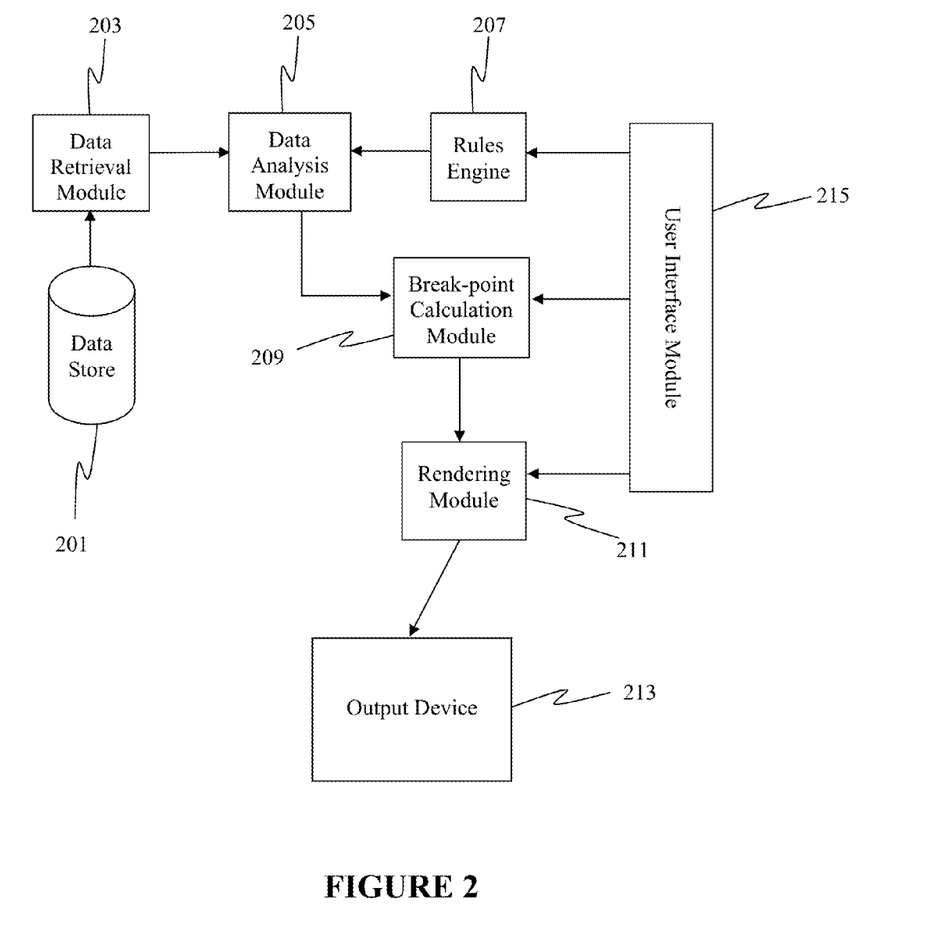
FIG. 2 shows a system block diagram for performing a method according to an embodiment of the present invention.

Referring to FIG. 2, a system block diagram is shown depicting the various modules and engines that may be utilized by the system as a whole in order to implement the methods described above.

A data store 201 stores the data values that are to be graphically represented by the system. For example, the data values may be taken from real world data sets extracted from real life measurement scenarios such as in manufacturing processes, quality control measurements, scientific experimental data, business records etc.

A data retrieval module 203 retrieves the data from the store according to instructions provided by the system. A data analysis module 205 analyses the retrieved data in order to determine the logarithmic base value. The data analysis module 205 determines the logarithmic base value based on a set of rules stored by a rules engine 207 which is in communication with the data analysis module 205. That is, the rules engine provides rules and instructions to the data analysis module to enable it to calculate the logarithmic base value using one of the methods discussed above. For example, the rules engine may provide a look up table to enable the data analysis module to determine a percentage value for calculating a logarithmic base value from one or more maximum data values.

A breakpoint calculation module 209 receives the logarithmic base value from the data analysis module 205 and calculates the breakpoint values for the breakpoint boundaries based on the number of breakpoints desired. That is, the breakpoint calculation module 209 calculates which colors, for example, are to be allocated to represent data values that fall within each of the breakpoint boundaries.

A rendering module 211 utilizes the breakpoint values received from the breakpoint calculation module 209 to graphically render the data values as they are received from the data store 201. The rendered images are then output on an output device 213 in the desired and chosen format. For example, the output device may be a graphical display screen or printing device, or may be a further data store for storing the rendered images.

A user interface module 215 is used to enable a user to control the rules engine 207. For example, the user interface may be used to write new rules for the rules engine or, to make modifications to existing rules. Further, the user interface module 215 may provide the breakpoint calculation module 209 with the desired number of breakpoints as determined by the user. Also, the user interface module 215 may provide the rendering module instructions on the form in which the data values are to be rendered.

Figure 4:
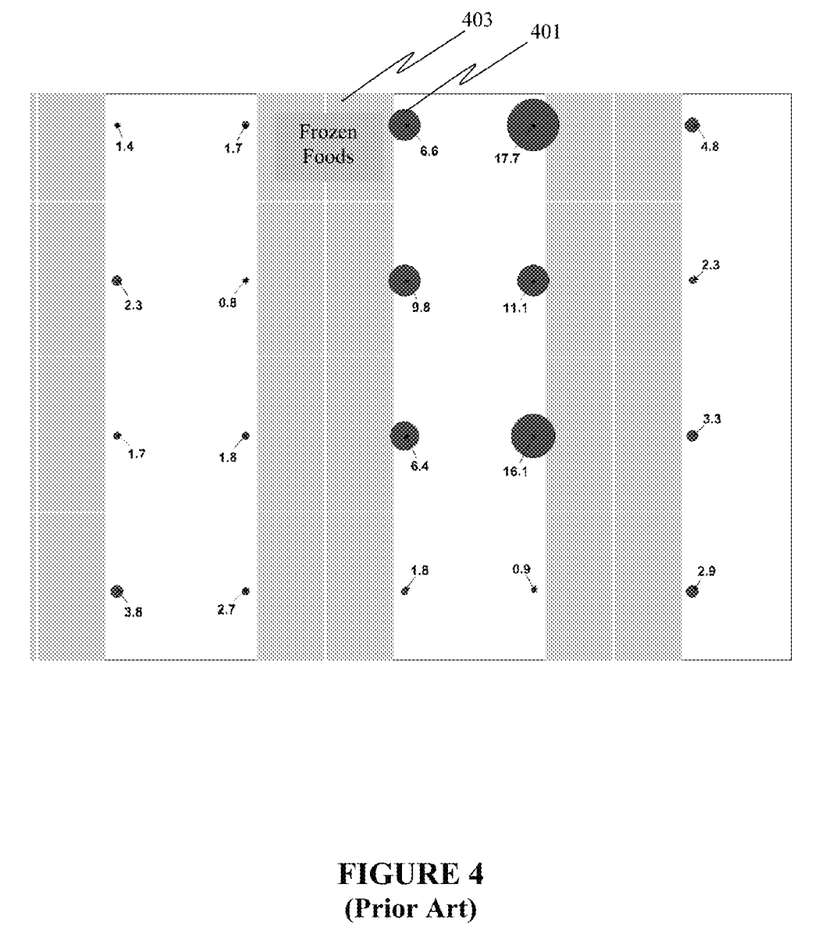
FIG. 4 shows a graphical visualization using a linear breakpoint algorithm.
Figure 5:
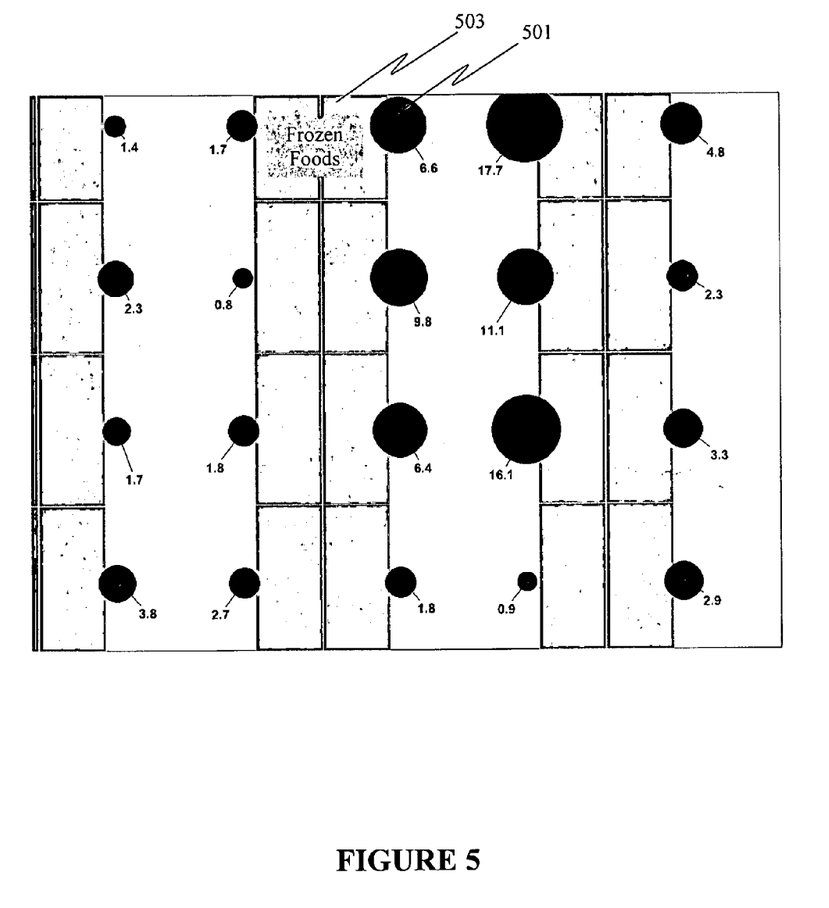
FIG. 5 shows a graphical visualization using an exponential breakpoint algorithm according to a further embodiment of the present invention.

FIGS. 4 and 5 show comparable examples of a data visualization rendered with breakpoint values calculated using a linear breakpoint algorithm as known in the prior art (FIG. 4), and a data visualization rendered with breakpoint values calculated using an exponential breakpoint algorithm as calculated using any one of the herein described methods and system (FIG. 5).

According to FIG. 4, various icons 401 are shown that represent the data points for various products on a product shelf 403, which in this example is a frozen foods section of a supermarket. Each of these icons is sized according to the value associated with the point it represents. The icons are sized using a linear scale in order to represent the values.

According to FIG. 5, icons 501 are also shown to represent the data points for various products on a product shelf 503. Each of these icons is also sized according to the value associated with the point it represents. However, the icons are sized using an exponential scale using any of the above described methods in order to represent the values. Therefore, the smaller values (0.9 for example) can be clearly seen.

The banding method used by the exponential breakpoint method is most commonly applied to heatmaps to choose the color breakpoints. The graduated symbols used in FIG. 5 show the effect of banding of the data. It will be understood however that each of these bands would typically have different color values and that this representation is shown merely as an easily interpretable visual example.

In the linear method of setting the breakpoints as shown in FIG. 4, the lower values are hard to distinguish (as they are small) and the larger values swamp the visualization. Using the exponential breakpoint method of FIG. 5, the banded graduated symbols are distinguishable in sizes and each band of data is comparable to the next band.

It will be understood that the addition of color or hue variations further enhances the benefits of this method.

Second Embodiment

According to a further embodiment, the system determines a logarithmic base value for use in calculating the transition boundary values that define the transition boundaries. The logarithmic base value is determined from a known or defined maximum data value and a known or defined number of transitions. According to this example, the logarithmic base value is calculated using two variables.

Figure 3:
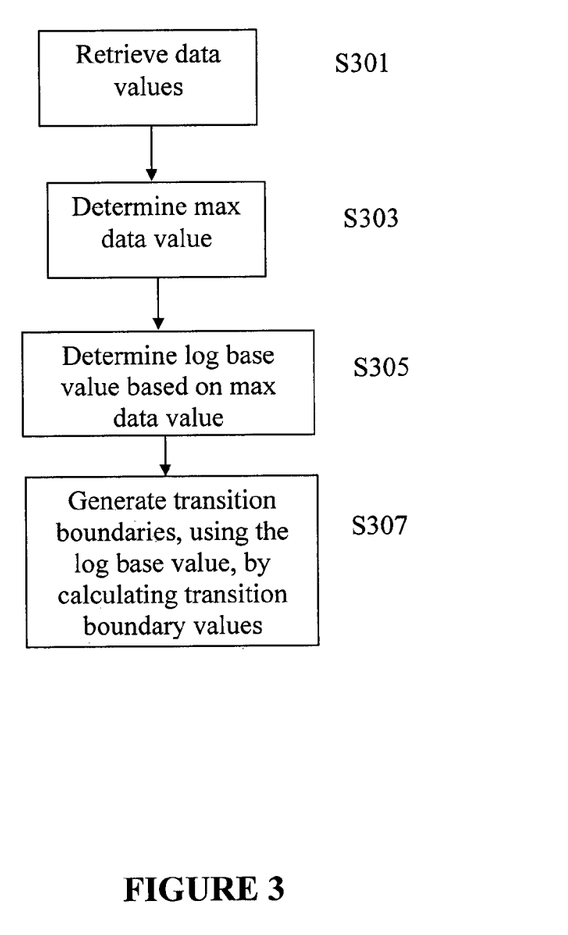
FIG. 3 shows a flow diagram according to a further embodiment of the present invention.

FIG. 3 shows a flow diagram of how the herein described system utilizes a computer implemented method of determining transition boundaries from data values in a data set for the generation of a graphical heatmap representation of the data values.

In step S301, data values in a data set are retrieved from a data store. In step S303, the data values are analyzed by the system to determine the maximum data value within the data set. In step S305, a logarithmic base value is determined based on the determined maximum data value. In step S307, transition boundaries are generated from calculated transition boundary values using the log base value.

As in the first embodiment, the transition boundary values: are calculated by using an exponential function with has a base value and an exponent value. The base value is the determined logarithmic base value. In this embodiment, the exponent value is incrementally increased from a value of one up to a value equal to the number of determined transition boundaries.

As an example, the first transition boundary is set as being between a value of 0 and a value where the exponent value is 1 (i.e. the base value). The second transition boundary is set as being between a value where the exponent value is 1 and a value where the exponent value is 2. The exponent value is increased incrementally up until a value equal to the number of determined transition boundaries.

According to this embodiment, the exponent value is incremented in integer units of 1.

According to a first technique, the logarithmic base value is calculated by the system using the calculation $$\text{logarithmic base value} = y^x$$

where y=the maximum data value, and x=1/the number of transition boundaries.

The system detects the required number of transition boundaries. For example, the number of transition boundaries may be selected by a user and stored in memory for use by the system. Alternatively, the system may automatically select the number of transition boundaries to be used based on system requirements or user preferences, for example.

The system further detects the maximum data value in the data set.

Based on the number of transition boundaries and the maximum data value, a precise logarithmic base value can be calculated to provide an exponential range from 0 to the maximum data value over the required number of transitions.

For example, if the maximum data value was detected as being 23,000 and the number of transitions required was 7 (i.e. 7 colors were made available for the system to graphically represent the full data set), then:

$$\text{logarithmic base value} = 23{,}000 \text{ to the power of } 1/7 = 4.2$$

Therefore, the transition boundaries would lie as follows:
Transition 1: 0→4.2
Transition 2: 4.2→4.2²=17.6
Transition 3: 4.2²→4.2³=74
Transition 4: 4.2³→4.2⁴=311
Transition 5: 4.2⁴→4.2⁵=1307
Transition 6: 4.2⁵→4.2⁶=5489
Transition 7: 4.2⁶→4.2⁷=23,050

Each of the calculated transition boundary values (e.g. 4.2, $4.2^2$ etc) may be used as a maxima or minima for the transition boundaries.

Each data value that falls within a transition boundary is then graphically represented as a data point in a particular forms based on the transition in which the data point lies. For example, the transition boundaries may determine what color or shade the data values are represented in the graphical heatmap representation.

According to a second technique, the logarithmic base value may be determined from a look up table with reference to the maximum data value and the number of transition boundaries.

For example, the following table may be used to determine the most suitable base value. The following values were calculated using the above equation:

$$\text{logarithmic base value} = y^x$$

where y=the maximum data value, and x=1/the number of transition boundaries.

|  | Max data value | | | | | |
| --- | --- | --- | --- | --- | --- | --- |
|  | 10 | 100 | 1000 | 10000 | 100000 | 1000000 |
| 3 transitions | 2.154 | 4.642 | 10.000 | 21.544 | 46.416 | 100.000 |
| 4 transitions | 1.778 | 3.162 | 5.623 | 10.000 | 17.783 | 31.623 |
| 5 transitions | 1.585 | 2.512 | 3.981 | 6.310 | 10.000 | 15.849 |
| 6 transitions | 1.468 | 2.154 | 3.162 | 4.642 | 6.813 | 10.000 |

-continued

| | Max data value | | | | | |
|---|---|---|---|---|---|---|
| | 10 | 100 | 1000 | 10000 | 100000 | 1000000 |
| 7 transitions | 1.389 | 1.931 | 2.683 | 3.728 | 5.179 | 7.197 |
| 8 transitions | 1.334 | 1.778 | 2.371 | 3.162 | 4.217 | 5.623 |
| 9 transitions | 1.292 | 1.668 | 2.154 | 2.783 | 3.594 | 4.642 |
| 10 transitions | 1.259 | 1.585 | 1.995 | 2.512 | 3.162 | 3.981 |
| 11 transitions | 1.233 | 1.520 | 1.874 | 2.310 | 2.848 | 3.511 |
| 12 transitions | 1.212 | 1.468 | 1.778 | 2.154 | 2.610 | 3.162 |
| 13 transitions | 1.194 | 1.425 | 1.701 | 2.031 | 2.424 | 2.894 |
| 14 transitions | 1.179 | 1.389 | 1.638 | 1.931 | 2.276 | 2.683 |
| 15 transitions | 1.166 | 1.359 | 1.585 | 1.848 | 2.154 | 2.512 |

For example, if 8 transitions were required and the maximum data value was determined to be close to 1,000,000, then the logarithmic base value would be selected as 5.623.

It will be understood that the methods according to this embodiment may also be implemented using a system as shown in FIG. 2. That is, the rules engine may be modified to enable the above methodologies to be applied within the data analysis module.

Third Embodiment

It will be understood that the various embodiments herein described are particularly useful when graphically representing data of a skewed nature. In particular, the above described methods are useful for representing data obtained from a gaming environment.

Figure 6:
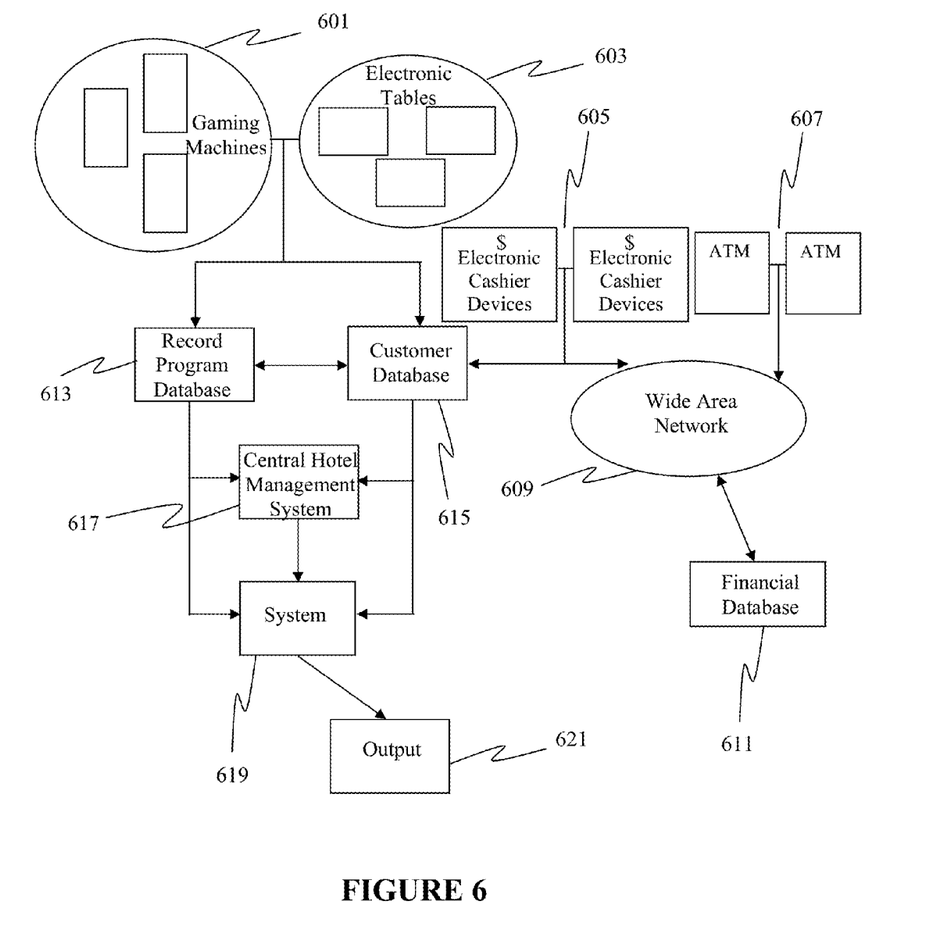
FIG. 6 shows a system block diagram of a gaming environment used according to a further embodiment of the present invention.

A system block diagram of a gaming environment used to implement any of the herein described methods is shown in FIG. 6.

FIG. 6 shows an example of how the herein described system may be incorporated within a gaming environment. The gaming environment consists of a number of gaming machines 601 and electronic tables 603 (among other electronic gaming devices) that are adapted to communicate electronically with other systems using any suitable protocols, such as data packet protocols.

The gaming environment further includes a number of electronic cashier devices 605 and ATMs 607 which are in communication via a Wide Area Network 609 with one or more financial databases 611.

Data from the gaming machines 601 and electronic tables 603 are transferred to a reward program database 613 and customer database 615. It will be understood that these two databases may be combined into a single database.

Data from the cashier devices are also transferred to the reward program database 613 and customer database 615. The databases 613 and 615 are in communication with a central hotel management system 617 that oversees the operation of the gaming environment, including the activities of customers in other areas of a casino, such as shops, hotels, spas etc.

The system 619 described herein is in communication with the reward program database 613, customer database 615 and central hotel management system 617 so the system can retrieve all necessary data about the activities within the gaming environment. The various embodiments as described herein are employed by the system 619 to provide an output 621.

For example, the retrieval of, or calculations for, theoretical win values would be particular suited to any such graphical representation methods as herein described. This is because theoretical win values have a huge skew, due to the values being extremely concentrated into a few customers.

Further Embodiments

It will be understood that the embodiments of the present invention described herein are by way of example only, and that various changes and modifications may be made without departing from the scope of invention.

It will be understood that, as an alternative, the logarithmic base value may be determined from a detected user selection. That is, a user enters a required base value into the system using an input device and this is stored in memory for use during the rendering of the graphical representation.

The invention claimed is:

1. In a data visualization computing system, a computer implemented method of determining transition boundaries from data values in a data set for the generation of a graphical heatmap representation of the data values, the method including the steps of the data visualization computing system:
retrieving the data values in the data set;
determining a logarithmic base value, wherein the base value is calculated based on the retrieved data values; and
generating transition boundaries for the heatmap representation by calculating transition boundary values, wherein the transition boundary values are calculated using an exponential function with a base value equal to the determined logarithmic base value and an exponent value that is incrementally increased from a value of one to a maximum exponent value to represent the retrieved data values.

2. The method of claim 1, wherein the base value is calculated from minimum data values within the data set.

3. The method of claim 2, wherein the base value is calculated as the lowest data value in the data set that is greater than 1.

4. The method of claim 1, wherein the base value is calculated from one or more maximum data values within the data set.

5. The method of claim 4, wherein the base value is calculated as a percentage value or fraction of the maximum data value.

6. The method of claim 1, wherein the base value is calculated from the total data value of the data set.

7. The method of claim 6, wherein the base value is calculated as a percentage value or fraction of the total data value.

8. The method of claim 1 further including the steps of determining a maximum data value from the data values in the data set;
determining the logarithmic base value based on the determined maximum data value; and
generating the transition boundaries between a zero value to the maximum data value by calculating the transition boundary values using the exponential function where the exponent value is incrementally increased to the maximum exponent value where the maximum exponent value results in a transition boundary value that is greater than or equal to the maximum data value.

9. The method of claim 8, wherein the exponent value is increased in fractions.

10. The method of claim 8, wherein the exponent is increased in integers.

11. The method of claim 10, wherein the exponent is increased in units with a value between 1 and 3.

12. In a data visualization computing system, a computer implemented method of determining transition boundaries from data values in a data set for the generation of a graphical heatmap representation of the data values, the method including the steps of the data visualization computing system:
retrieving the data values in the data set;
determining a maximum data value from the retrieved data values;
determining how many transition boundaries are required for generating the heatmap; and
calculating a logarithmic base value; and
generating the transition boundaries for the heatmap representation by calculating transition boundary values, where the transition boundary values are calculated using an exponential function with a base value equal to the determined logarithmic base value and an exponent value that is incrementally increased from a value of one to a value equal to the number of determined transition boundaries.

13. The method of claim 12, wherein the logarithmic base value is determined from a detected user selection 14. The method of claim 12, wherein the logarithmic base value is determined from a look up table with reference to the maximum data value and the number of transition boundaries.

15. The method of claim 12, wherein the logarithmic base value is determined by calculating yx where y is equal to the maximum data value, and x is equal to 1 divided by the number of transition boundaries.

16. The method of claim 12, wherein the number of transition boundaries is determined based on a detected user selection.

17. The method of claim 1, wherein each of the calculated transition boundary values are used as maxima or minima for the transition boundaries.

18. The method of claim 1, wherein the transition boundaries determine in what form the data values are represented in the graphical heatmap representation.

19. The method of claim 1, wherein the transition boundaries determine what color or shade the data values are represented in the graphical heatmap representation.

20. A data visualization computing system for determining transition boundaries from data values in a data set for the generation of a graphical heatmap representation of the data values, the data visualization computing system including:
a data retrieval module arranged to retrieve the data values in the data set;
a data analysis module arranged to determine a logarithmic base value, wherein the base value is calculated based on the retrieved data values and a set of rules stored in a rules engine; and
a breakpoint calculation module arranged to generate transition boundaries for the heatmap representation by calculating transition boundary values, wherein the transition boundary values are calculated using an exponential function with a base value equal to the determined logarithmic base value and an exponent value that is incrementally increased from a value of one to a maximum exponent value to represent the retrieved data values.

21. A data visualization computing system for determining transition boundaries from data values in a data set for the generation of a graphical heatmap representation of the data values, the data visualization computing system including:
a data retrieval module arranged to retrieve the data values in the data set;
a data analysis module arranged to determine a maximum data value from the data values in the data set, determine how many transition boundaries are required for generating the heatmap and calculate a logarithmic base value; and
a breakpoint calculation module arranged to generate the transition boundaries for the heatmap representation by calculating transition boundary values, where the transition boundary values are calculated using an exponential function with a base value equal to the determined logarithmic base value and an exponent value that is incrementally increased from a value of one to a value equal to the number of determined transition boundaries.

* * * * *